(12) United States Patent
Kassmann et al.

(10) Patent No.: US 8,249,917 B1
(45) Date of Patent: Aug. 21, 2012

(54) LOAD BALANCING FOR A FULFILLMENT NETWORK

(75) Inventors: Dean E. Kassmann, Bellevue, WA (US); Chris V. Jones, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1540 days.

(21) Appl. No.: 11/296,859

(22) Filed: Dec. 7, 2005

(51) Int. Cl.
*G06Q 10/00* (2006.01)

(52) U.S. Cl. ............................... 705/12; 705/28; 705/22

(58) Field of Classification Search .................. None
See application file for complete search history.

(56) References Cited

U.S. PATENT DOCUMENTS

| | | | |
|---|---|---|---|
| 5,301,320 A * | 4/1994 | McAtee et al. ............. 705/7.13 |
| 5,530,744 A * | 6/1996 | Charalambous et al. 379/266.08 |
| 5,623,413 A * | 4/1997 | Matheson et al. ............ 701/117 |
| 5,890,133 A * | 3/1999 | Ernst ............................ 705/7.27 |
| 5,953,707 A | 9/1999 | Huang et al. |
| 6,327,363 B1 * | 12/2001 | Henderson et al. ...... 379/265.01 |
| 6,519,571 B1 * | 2/2003 | Guheen et al. ............. 705/14.66 |
| 6,550,057 B1 * | 4/2003 | Bowman-Amuah .......... 717/126 |
| 6,622,127 B1 * | 9/2003 | Klots et al. ...................... 705/28 |
| 6,775,371 B2 * | 8/2004 | Elsey et al. .............. 379/218.01 |
| 6,920,427 B2 | 7/2005 | Anthony et al. |
| 6,970,841 B1 * | 11/2005 | Cheng et al. .................... 705/28 |
| 6,975,937 B1 * | 12/2005 | Kantarjiev et al. ........... 701/117 |
| 7,062,617 B2 | 6/2006 | Dundas |
| 7,111,300 B1 * | 9/2006 | Salas et al. ..................... 718/105 |
| 7,177,825 B1 * | 2/2007 | Borders et al. ............. 705/26.81 |
| 7,243,074 B1 | 7/2007 | Pennisi, Jr. |
| 7,295,990 B1 * | 11/2007 | Braumoeller et al. ............. 705/7 |
| 7,370,005 B1 * | 5/2008 | Ham et al. ....................... 705/28 |
| 7,430,519 B2 * | 9/2008 | Thompson et al. ........... 705/7.14 |
| 7,499,867 B2 * | 3/2009 | Lahey et al. .................. 705/7.13 |
| 7,747,543 B1 | 6/2010 | Braumoeller et al. |
| 7,848,953 B2 | 12/2010 | Kahlon et al. |
| 2001/0029525 A1 | 10/2001 | Lahr ............................. 709/218 |
| 2002/0054587 A1 * | 5/2002 | Baker et al. .................... 370/352 |
| 2002/0152001 A1 * | 10/2002 | Knipp et al. .................. 700/100 |
| 2002/0165804 A1 | 11/2002 | Beebe et al. |
| 2002/0188486 A1 * | 12/2002 | Gil et al. ............................ 705/7 |
| 2002/0194251 A1 * | 12/2002 | Richter et al. ................. 709/105 |
| 2003/0172007 A1 | 9/2003 | Helmolt et al. |
| 2003/0208392 A1 | 11/2003 | Shekar et al. |
| 2004/0210621 A1 | 10/2004 | Antonellis |
| 2004/0254825 A1 | 12/2004 | Hsu et al. |
| 2004/0254842 A1 * | 12/2004 | Kirkegaard ...................... 705/22 |
| 2005/0075748 A1 * | 4/2005 | Gartland et al. .............. 700/108 |
| 2005/0165881 A1 * | 7/2005 | Brooks et al. ................. 709/200 |
| 2005/0198200 A1 * | 9/2005 | Subramanian et al. ....... 709/218 |
| 2005/0246042 A1 | 11/2005 | Bickley et al. |

(Continued)

OTHER PUBLICATIONS

"What Is PID—Tutorial Overview," available at <<http://www.expertune.com/tutor.html>>, accessed on Feb. 18, 2006, 5 pages.

(Continued)

*Primary Examiner* — Jonathan G Sterrett
*Assistant Examiner* — Stephen S Swartz
(74) *Attorney, Agent, or Firm* — Lee & Hayes, PLLC

(57) ABSTRACT

A load balancing system for a merchandise fulfillment network is described. The load balancing system employs PID (Proportional, Integral, Derivative) load balancing functionality or other kind of closed loop control functionality to select, on an order-by-order basis, which fulfillment resources (such as fulfillment centers) are to handle customer orders.

19 Claims, 8 Drawing Sheets

U.S. PATENT DOCUMENTS

| | | | |
|---|---|---|---|
| 2006/0149413 A1* | 7/2006 | Perez et al. | 700/213 |
| 2006/0224496 A1* | 10/2006 | Sandholm et al. | 705/37 |
| 2009/0307096 A1 | 12/2009 | Antonellis | |
| 2010/0262453 A1 | 10/2010 | Robinson et al. | |

OTHER PUBLICATIONS

U.S. Appl. No. 09/965,121, filed Sep. 27, 2001, "Dynamically Determining Actual Delivery Information for Orders Based on Actual Order Fulfillment Plans."

U.S. Appl. No. 09/965,125, filed Sep. 27, 2001, "Generating Current Order Fulfillment Plans Based on Expected Future Orders."

Agatz, et al., "E-fulfillment and multi-channel distribution—A review", Elsevier B.V., European Journal of Operational Research, Apr. 24, 2007, vol. 187, 2008, pp. 339-356.

Armistead, "The "coping" capacity management strategy in services and the influence on quality performance", International Journal of Service Industry Management, vol. 5, No. 2, Sep. 1994, pp. 5-22.

"Dictionary.com, Merchandise", retrieved on May 10, 2011 at <<http://dictionary.reference.com/browse/merchandise>>, Dictionary.com. LLC, 2011, pp. 1-2.

Kassmann, et al., "Supply Chain Design, Management and Optimization", Elsevier B.V., European Symposium on Computer Aided Process Engineering and International Symposium on Process Systems Engineering, Jul. 2006, pp. 101-106.

Layden, "A Rapidly Changing Landscape", ABI/INFORM Global, Manufacturing Systems, Mar. 1996, pp. 10A-18A.

Liu, et al., "Optimal Multivariate Control for Differentiated Services on a Shared Hosting Platform", Proceedings of IEEE Conference on Decision and Control, New Orleans, LA, Dec. 2007, pp. 3792-3799.

Non-Final Office Action for U.S. Appl. No. 12/210,895, mailed on Jul. 18, 2011, Kassmann, "Multivariable Load Balancing in a Fulfillment Network", 25 pages.

Silver, et al., "Coordinated Replenishments at a Single Stocking Point", Inventory Management and Production Planning and Scheduling, Third Edition, John Wiley and Sons, Inventory Management and Production Planning and Scheduling, Chapter 11, Jan. 1998, pp. 423-443.

Xu, et al., "The Benefits of Re-Evaluating Real-Time Fulfillment Decisions", Amazon.com, Nov. 19, 2004, 7 pages.

Final Office Action for U.S. Appl. No. 12/210,895, mailed on Jan. 30, 2012, Kassmann et al., "Multivariable Load Balancing in a Fulfillment Network", 20 pages.

* cited by examiner

LOAD BALANCING FOR A FULFILLMENT NETWORK

BACKGROUND

In e-commerce, customers purchase merchandise by accessing a website, selecting one or more items, entering payment information, and indicating a preferred delivery date. In most cases, the merchandise later magically appears on their doorstep at or before the delivery date. This easy and convenient form of shopping has spawned an online retailing industry that is growing rapidly each year.

The behind-the-scenes processes that fulfill online purchase orders and ensure timely and efficient delivery of merchandise to customers are not, however, magic. Indeed, the fulfillment processes are quite complex. Generally, the fulfillment processes can rely on a fulfillment network that includes geographically dispersed fulfillment centers for handling orders. Consider the task of fulfilling a typical common purchase order for diverse items, such as a book, a toy, a DVD, and a digital camera. Suppose further that the customer lives in California, but the e-commerce company has fulfillment centers in other parts of the country. Determining which center or centers should handle all or parts of the task is a difficult problem. Moreover, the solution to this problem has important cost-related implications, as choosing a non-optimal fulfillment center can result in higher operating costs.

Accordingly, there is a need to effectively manage selection of fulfillment resources to fulfill purchase orders for merchandise that is ordered online.

SUMMARY

A load balancing system for a merchandise fulfillment network is described. In one exemplary implementation, the load balancing system employs PID (Proportional, Integral, Derivative) control to load-balance the processing of customer orders among different fulfillment resources in the fulfillment network.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items. A reference number having a parenthetical suffix (as in "132(1)") identifies a species of the feature represented by the general reference number (e.g., "132"); further, use of the general reference number without a parenthetical suffix (as in "132") identifies any one or more of the species.

DETAILED DESCRIPTION

Figure 1:
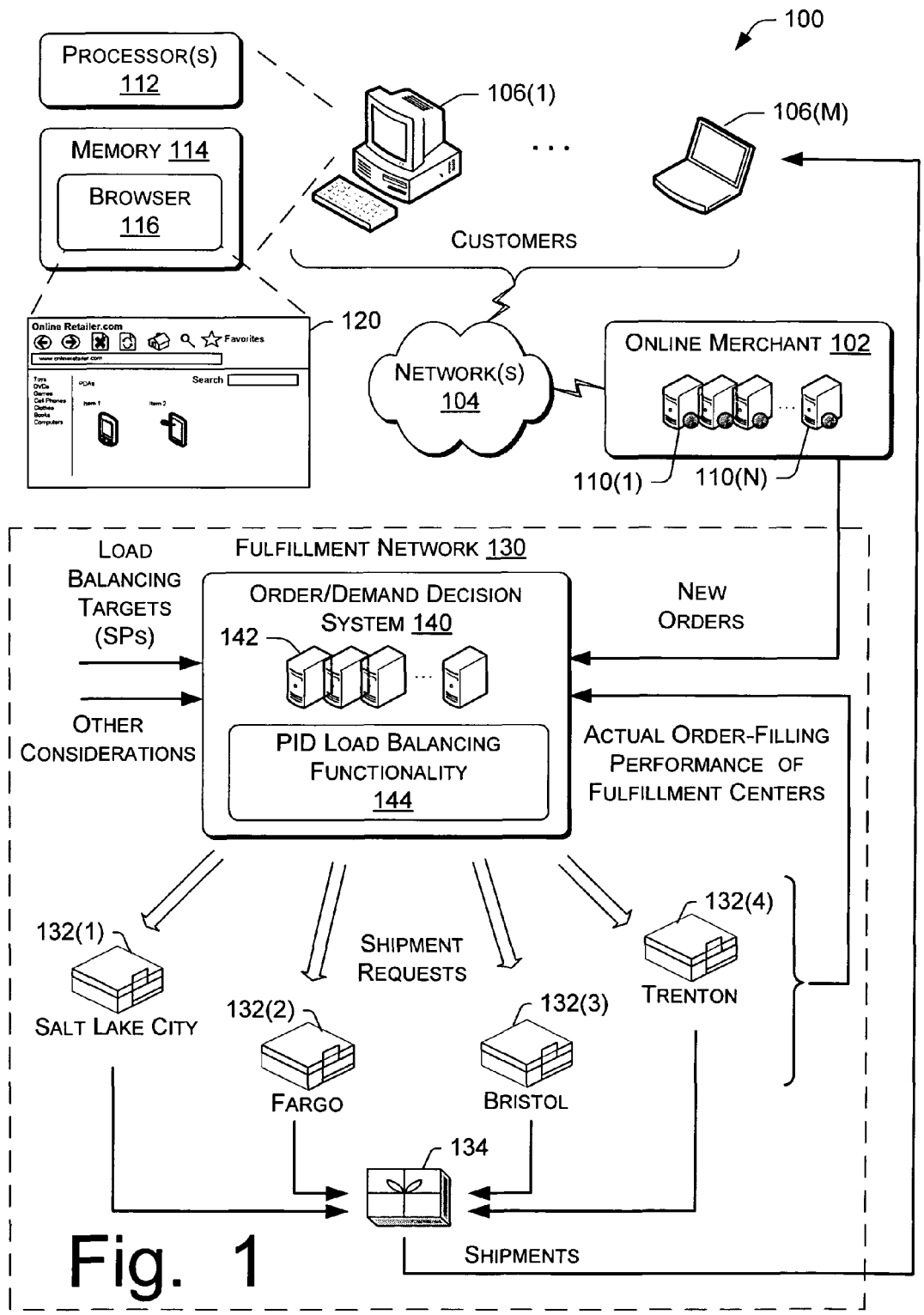
FIG. 1 illustrates an exemplary architecture of a fulfillment network in which PID load balancing functionality (or other kinds of control functionality) can be deployed.

According to one exemplary implementation, this disclosure is directed to strategies for balancing the processing of requests (such as online customer orders for merchandise) across multiple fulfillment resources that form a fulfillment network. The balancing is achieved using control functionality that employs a closed loop control algorithm. One exemplary implementation of such control functionality uses a Proportional, Integral, Derivative (PID) control algorithm to allocate processing tasks to different fulfillment resources in the network.

As used herein, the terms "fulfillment network" and "fulfillment resource" should be broadly construed. A fulfillment network generally refers to any infrastructure for processing requests for items of any nature (including, but not limited to, online orders for goods and/or services). A "fulfillment resource" refers to any component of the infrastructure used to process the requests.

In an implementation emphasized in this disclosure, a fulfillment network may include a plurality of fulfillment centers for handling customer orders. And each center, in turn, may include multiple processing queues for handling orders. Each such distinct aspect of the fulfillment network can be considered a fulfillment resource. In this case, the fulfillment network is devoted to distributing items from one or more inventories of items to end-user recipients.

However, the principles described herein can be applied to other business and technical scenarios. In one such alternative scenario, a fulfillment network can be applied to distribute items to one or more intermediary entities that, in turn, further provide the items to other entities. For instance, the fulfillment network can be applied to distribute items to one or more merchants that, in turn, provide the items to their respective customers.

In another alternative scenario, a fulfillment network comprising one or more fulfillment resources can be applied to control a supply chain inflow of merchandise items to one or more inventories of items. In this case, one or more suppliers can instruct a merchant to add one or more items of merchandise to one or more inventories of items. For instance, the fulfillment network can be applied to control the flow of merchandise items from third party entities (e.g., vendors) to a central merchant, which, in turn, offers these items for distribution (e.g., sale) to its customers. The inbound flow can be throttled based on any variable or combination of variables.

Still further use scenarios are possible.

As used herein, an "item" refers to any discrete resource that can be purchased or sold (or, more generally, acquired, disposed of, distributed, transferred, stored, processed or reprocessed, recycled, etc.), or subject to some other action by any entity.

An "order" refers to a request to purchase or otherwise acquire one or more items or to perform some other action or actions pertaining to an item or items. To facilitate discussion, the term "order" as used herein can refer to either a single request by a user (or other entity) to, e.g., acquire a particular item, or a component request in a multi-item request to acquire multiple items. More generally, the terms "order" and "request" are used interchangeably herein.

Architecture

FIG. 1 illustrates one exemplary architecture 100 in which a fulfillment network for fulfilling customer orders can be used. The architecture 100 can include many online merchants, including representative merchant 102. Merchant 102 hosts a website accessible over one or more communication couplings or networks 104 by many customer computing devices 106(1), . . . , 106(M). The network(s) 104 represents any type of network or combination of networks, such as a wide area network (e.g., the Internet), an intranet, and so forth. The networks 104 can be implemented using any combination of networking technology, such as various hardwired and wireless links, routers, gateways, name servers, and so forth (not shown).

The online merchant 102 hosts the website using one or more web servers 110(1), . . . , 110(N), perhaps arranged as a server farm, including conventional front-end and back-end processing functionality. Other server architectures can also be used to host the site. The online merchant 102 can handle requests from many users and supply, in response, various web pages that can be rendered at the customer computing devices 106. The merchant website is representative of essentially any site that sells, rents, licenses, trades, or otherwise provides goods (including without limitation tangible goods, digital goods available for download, etc.), services, or other forms of merchandise (generally referred to herein as "merchandise items"). Or the merchant 102 may represent an entity that disseminates informational resources (e.g., news, customer service information, etc.) to the computing devices 106, or provides some other kind of service in which any kind of customer request, typically placed by human individuals or on behalf of human organizations, can be fulfilled.

The customer computing devices 106 (also referred to as "client computers" or simply "clients") are illustrated as including a personal computer and a laptop computer, but can also be implemented as other devices, such as a set-top box, a personal digital assistant (PDA), a game console, a laptop computer, a mobile telephone, and so forth. Each computing device 106 is equipped with one or more processors 112 and memory 114 to store applications and data. A browser application 116 can be implemented at the computing device 106 (as shown in FIG. 1), or can alternatively be implemented by a remote server site, or can alternatively be implemented in distributed fashion at both local and remote sites, and so on. The browser application 116 provides access to the website hosted by the online merchant 102. In particular, the browser application 116 renders web pages served by the merchant 102's website on an associated display.

In one exemplary implementation, the web pages present various items being offered by the online merchant 102, or marketed through the merchant website. One exemplary webpage 120 is shown that offers different types of portable computing devices for sale. The webpage 120 can further include many other categories of items, such as books, music, and so on. Customers are free to browse the merchant 102's website and purchase items. This invokes a series of operations to be described below. (It should be noted that the processing operations described herein can also be applied to scenarios in which the customer makes requests that do not necessarily involve the purchase of goods and services, but which nevertheless consume the architecture 100's processing resources in some fashion. For instance, the principles described herein can be invoked when the customer rents an item, or merely borrows an item free of charge, and so on. However, to facilitate explanation, this disclosure will emphasize the exemplary scenario in which the customer makes requests that involve the purchase of goods or services to be physically delivered to the customer.)

When a customer purchases an item (or items) from the merchant 102's website, the customer may enter payment information and shipping preferences. The shipping preferences may optionally ask the customer to specify a method of delivery (e.g., overnight courier, priority mail, etc.) and/or a target delivery date (e.g., 1 day, 2 day, 3-7 days, etc.). The various shipping options usually have different associated costs. To ensure customer satisfaction, the online merchant 102 seeks to deliver the item on time and according to the customer's shipping preferences. At purchase, the merchant generates a fulfillment order (or simply "order") that specifies the selected item and the customer's shipping preferences.

A fulfillment network 130 receives the orders from the online merchant 102 and processes these orders (by "fulfilling," e.g., carrying out, the orders). The fulfillment network 130 can be owned and operated by the online merchant 102. Alternatively, the network 130 can be owned and operated at least in part by a separate commercial entity. For instance, in one case, the fulfillment network 130 can be implemented by the merchant 102 and can be used to exclusively service the fulfillment orders generated by the merchant 102. In another case, the fulfillment network 130 can service multiple different merchants.

The fulfillment network 130 includes multiple fulfillment resources, which in this exemplary instance are used to carry out the customer orders. As noted above, a fulfillment resource refers to any functionality used to process fulfillment orders—in effect, to fulfill the orders. In the simplified case shown in FIG. 1, the fulfillment resources correspond to different fulfillment centers 132(1)-132(4).

The fulfillment centers 132(1)-132(4) can be established geographically to accommodate orders from various population regions. Namely, in the illustrated example, four fulfillment centers 132(1)-132(4) are arranged within the geographical region of the United States or North America. These exemplary centers include: a site 132(1) in Salt Lake City, Utah; a site 132(2) in Fargo, N. Dak.; a site 132(3) in Bristol, Tenn.; and a site 132(4) in Trenton, N.J. Note that the network 130 can have more or less than four fulfillment centers. Further, the network 130 can deploy other fulfillment centers to serve other geographical regions besides North America, such as Europe, South America, and Asia, and/or individual countries in these regions.

In one implementation, the fulfillment centers 132(1)-132(4) can warehouse the merchandise (or are otherwise associated with an inventory of such merchandise). The fulfillment centers 132(1)-132(4) endeavor to fulfill the orders received by the network 130 from the online merchant 102 from their respective inventories. Orders can be filled using automated systems, trained employees, or a combination of systems and employees. For a particular order, a fulfillment center 132 locates the item purchased by the customer and places the item into a package 134, and then ships the package 134 to the customer according to the customer's shipping preferences.

In actual practice, a customer's order may specify multiple items. Depending on various considerations, the fulfillment network 130 may rely on a single fulfillment center 132 to process this multi-item order and then to ship the items in one or more packages. Or the fulfillment center 132 may rely on multiple different fulfillment centers 132 to process the order in piecemeal fashion and to ship the order out from multiple different locations. As noted above, to facilitate discussion, the term "order" as used here can refer to either a single request by a user to acquire a particular item, or a component request in a multi-item order to acquire multiple items. In other words, this disclosure will generally describe the work performed by a fulfillment center 132 in terms of the volume of items it outputs to customers, adopting an agnostic (open-ended) approach as to whether these items were specified in a single-item customer order or a multi-item customer order. This disclosure also adopts an agnostic approach as to the manner in which these items are packaged for output to the customer.

The fulfillment network 130 includes an order/demand decision system 140 (or simply "decision system" 140) that determines, in order-by-order fashion, which fulfillment resources should fulfill the individual items in the orders received from the online merchant 102. The decision system 140 can be implemented using a computerized order-by-order decision process. This process can be implemented using one or more servers or other computing functionality, represented by the server cluster 142. The system 140 can be implemented at a single site, or be distributed across multiple sites.

More specifically, in the simplified scenario shown in FIG. 1, the role of the decision system 140 is to determine which fulfillment centers 132(1)-132(4) should fulfill the orders received by the online merchant 102. There are many considerations that go into this decision including, for example: the location of the customers; the location of the fulfillment centers; the merchandise availability at the centers; the centers' capabilities; shipping costs; item costs; material costs; processing costs; other intangible costs (such as penalty costs for shipping an order late), and so forth. Other considerations can include high-level constraints, such as those that affect labor or outbound shipping capacity, although these constraints can alternatively be omitted from consideration.

Figure 3:
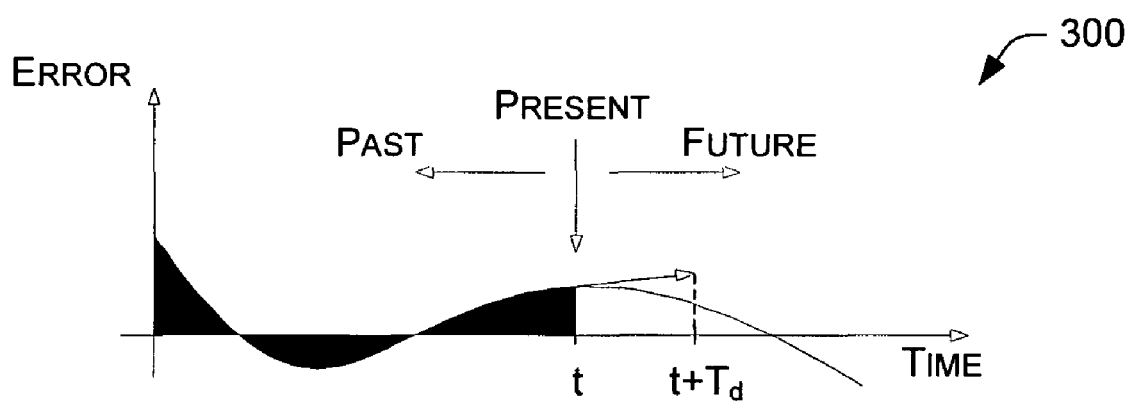
FIG. 3 shows a graph that plots error over time to illustrate the manner in which the PID load balancing functionality of FIG. 2 operates during load balancing.

The decision system 140 also bases its assignment decisions on load balancing considerations. To this end, the decision system 140 includes control functionality that employs closed loop control (to be described below). Different varieties of closed loop control algorithms can be used to implement the control functionality. To facilitate discussion, this disclosure primarily features the use of a Proportional, Integral, Derivative (PID) control algorithm as one concrete implementation of the control functionality. Accordingly, FIG. 3 shows that the decision system 140 includes PID load balancing functionality 144. The PID load balancing functionality 144 computes load-related costs for different fulfillment centers 132 (to be defined below). The decision system 140 takes these load-related costs into account as one consideration in deciding, on an order-by-order basis, which fulfillment centers 132 should handle the processing of customers orders.

In operation, by way of broad overview, the decision system 140 manages the work performed by the fulfillment centers 132 to satisfy various load balancing targets (to be described below). However, by virtue of the PID strategy used by the PID load-balancing functionality 144, the decision system 140 performs this control in a gradual fashion, allowing various deviations from optimal load balancing targets to accommodate a myriad of other considerations that may be affecting the distribution of orders within the network 130. Several such exemplary "other considerations" were mentioned above.

This gradual form of adjustment is beneficial because it helps reduce the overall cost of processing customer orders. That is, as appreciated by the present inventors, rigidly forcing the network 130 to adhere to load balancing targets on an order-by-order basis is not optimal, as there may be other considerations prevailing in the network 130 that may warrant temporary deviation from the load balancing goals. If load balancing considerations are too rigidly enforced to the exclusion of other considerations, this will impose its own deleterious costs on the fulfillment network 130. The PID strategy reduces these costs by permitting some deviation from load balancing goals; but at the same time, the PID strategy effectively manages this deviation such that it is not allowed to stray too far from the load balancing targets. Adherence to the targets is generally assured over the long run.

Decision System Control Structure

Figure 2:
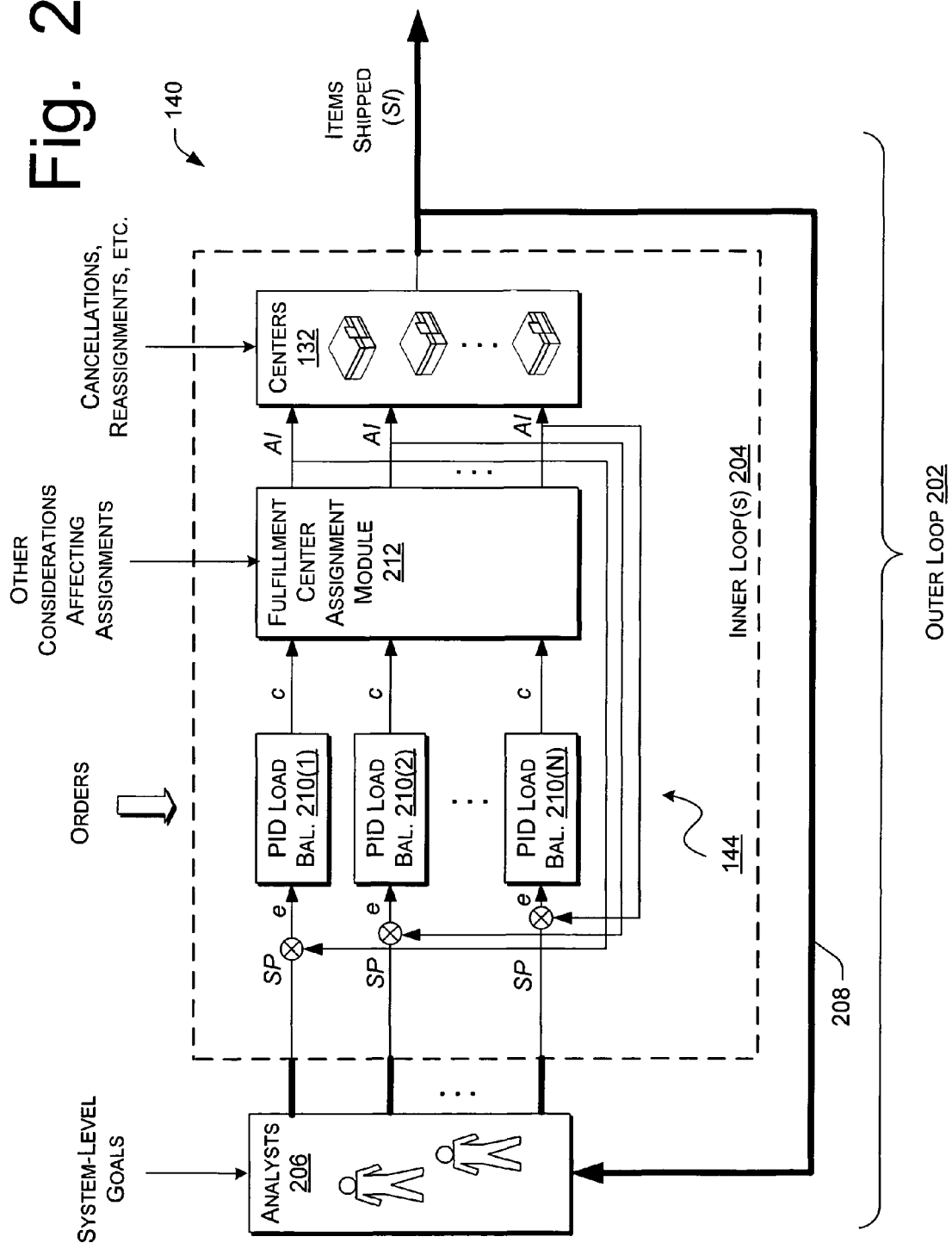
FIG. 2 illustrates an exemplary decision system for use in the architecture of FIG. 1.

FIG. 2 illustrates an exemplary control structure of order/demand decision system 140. The control structure allocates order-processing work to the different fulfillment resources (such as the different fulfillment centers 132). The control structure includes the PID load balancing functionality 144 as part thereof, although, alternatively, the control structure can employ other kinds of closed loop control functionality.

More specifically, the control structure defines a set of cascaded loops that drives order assignment (including cancellations and reassignments) toward planned shipment goals for each fulfillment center 132. The cascaded loops include an outer loop 202 and a series of inner loops 204. More specifically, FIG. 2 shows the outer loop 202 as a bold-lined outer loop, which includes the inner loops 204 as a component thereof. FIG. 2 shows the inner loops 204 as a series of loops enclosed by a dotted-line box. In general, each of the loops shown in FIG. 2 is a loop by virtue of its incorporation of a feedback path. The feedback path feeds information back to the input of the loop in the manner to be described below.

As to the outer loop 202, according to a first exemplary implementation, human analysts 206 define set point targets (SPs) for individual fulfillment resources. To enable these set point targets, a feedback path 208 supplies performance information to the analysts 206 regarding the overall performance of the fulfillment network 130, including the work performed by the various fulfillment centers 132. Different measurements can be used to assess the performance of the fulfillment network 130 as a whole. In one case, the performance measure can correspond to the number of ordered items (SIs) that have been shipped by each fulfillment resource. (The fulfillment centers 132 may ship out the items (SIs) in single-item packages or multi-item packages, so the SIs may or may not correspond to the number of packages shipped by the fulfillment resources.). In another case, the performance measure can correspond to an aggregation of assignments (AIs) fed into the fulfillment resources (e.g., based on the assumption that the assignments into the fulfillment resources will approximately equal the assignments actually completed by the fulfillment resources. In another case, the performance measure can correspond to an aggregation of assignments (AIs) fed into the fulfillment resources, as offset by a number of possible events which may affect the order-filling performance of the fulfillment resources. One such event is the cancellation of orders. Another such event is the reassignment of orders, resulting in orders being "fed" through the fulfillment network 130 two or more times. In addition to these order-based performance metrics, the analysts 206 can receive other information that reflects the performance of the fulfillment network 130, such as backlog considerations, market conditions, and so forth.

In addition to performance-related information, the analysts 206 receive information regarding system-level goals. These system-level goals may reflect high-level decisions regarding the manner in which the fulfillment network 130 is to be used to fulfill orders. For instance, the system-level goals may indicate, for various application-specific reasons, that it is more desirable to allocate a larger share of the order-filling work to the Bristol facility, compared to the Trenton facility, and so forth. A planning and forecasting system (to be discussed in greater detail below) can be used to define these system-level goals.

The analysts 206 make their decisions regarding the set point targets (SPs) based on the above-described system performance information and system-level goal information. The analysts 206 can make these decision based on appropriate business metrics, personal judgments, and so forth. In performing this analysis, the general objective of the analysts 206 is to define set point targets (SPs) which will drive the fulfillment network 130 so that its performance (as measured by SIs) matches the objectives defined by the system-level goal information. In another implementation, the manual analysis performed by the analysts 202 can be partly automated or entirely automated. For instance, FIG. 5, to be discussed in turn, describes an automatic control system that can be used to automate the computation of set point targets, or to partially automate the computation of set point targets.

As to the inner loops 204, these loops calculate load-related costs c which are used to steer network level order assignments toward the set point targets (SP) established by the analysts 206. To compute these costs, each of the inner loops 204 receives feedback information which reflects the volume of order assignments sent to each fulfillment resource, identified in FIG. 2 as AIs (representing "assigned items"). That is, an order assignment requests a fulfillment resource to fulfill an order, which can originate from a single-item customer order or can represent a component part of a multi-item customer order. The number of AIs fed to a fulfillment resource does not necessarily equal the number of items actually shipped (SIs) by the fulfillment resource because the fulfillment resource 132 may receive various reassignment orders, cancellations, and so forth.

The inner loops 204 can compute the costs (c) using appropriate control functionality, such as, but not limited to, the PID load balancing functionality 144. The PID load balancing functionality 144, in turn, can comprise plural PID load balancers 210(1)-210(N), each of which is configured to perform Proportional, Integral, Derivative (PID) control for a respective fulfillment resource. As noted above, a "fulfillment resource" can correspond to any component of the fulfillment network 130 that handles some aspect of order fulfillment processing. In the simplified case illustrated in FIG. 1, for instance, each fulfillment resource can correspond to a different fulfillment center 132. In this case, the PID functionality 144 can assign a different PID load balancer 210(1)-210(4) to each of the fulfillment centers 132(1)-132(4), respectively. In this role, the analysts 206 can define set-points (SPs) for each of the fulfillment centers 132 that define the amount of work that each center is asked to perform within the network 130. The PID load balancers 210(1)-210(4) compute costs c which are used as one consideration in deciding which fulfillment centers 132(1)-132(4) should process orders.

In another implementation, an individual fulfillment center 132 can include multiple processing queues for processing orders. For example, a fulfillment center 132 can allocate different processing queues for handling different kinds of items (e.g., electronics, books, music, apparel, jewelry, and so forth). In addition, or alternatively, the fulfillment center 132 can allocate different processing queues for handling orders based on different timing considerations (such as a queue for orders which are soon to be delivered, a queue for orders which are to be delivered within a week, and so forth). Still other bases exist for allocating the work performed by a single fulfillment center 132 into different processing queues. In this context, the PID load balancing functionality 144 can assign a different PID load balancer 210 to each one of these processing queues. For example, consider the case in which there are four fulfillment centers 132(1)-132(4), and each fulfillment center 132 includes two processing queues for handling orders based on the timing of delivery—a close-at-hand delivery queue and a within-the-month delivery queue. This makes a total of eight fulfillment resources. In this case, the PID load balancing functionality 144 can assign a different PID load balancer 210 to each of these fulfillment resources.

The set point targets can be defined for each of the PID load balancers 210 in any manner. In one case, the analysts 206 can specify the set point targets in terms of the fraction of the amount of order-processing work that each fulfillment resource is asked to perform. For example, consider the simplified case in which there are two PID load balancers 210 assigned to two different fulfillment centers 132. The analysts 206 may specify that a first fulfillment center 132(1) is to process X % of the total work flow through the network 130, while a second fulfillment center 132(2) is to process Y % of the total work flow through the network 130. The analysts 206 may decide to evenly allocate the work among the fulfillment centers 132 (e.g., such that the two centers each receive 50% of the work); or the analysts 206 may decide, for various environment-specific reasons, to unevenly distribute work among the fulfillment centers 132 (such that, in one illustrative case, the first center receives 70% of the work and the second center receives 30% of the work). In any case, the total amount of work performed by the fulfillment centers 132 should be 100% (due to the principle of conversation of "mass"—meaning that "orders in" must equal "orders out"). However, note that, in the specific case in which each fulfillment center 132 is associated with plural fulfillment resources, all of the fulfillment resources may not be in competition with each other to process a particular order. For example, consider the case in which each fulfillment center 132 includes a separate fulfillment resource to specifically handle orders for books as a distinct category of product. If an order is received for a book, only those fulfillment resources (and associated PID load balancers 210) associated with processing orders for books will be invoked as viable candidate resources.

As mentioned above, each PID load balancer 210 calculates a cost c that serves as one consideration in determining the manner in which orders are allocated among the fulfillment resources. For example, in the simplified case above, assume that a two-balancer scenario applies, where a first fulfillment center 132(1) is asked to process 70% of the work, while a second fulfillment center 132(2) is asked to perform the remaining 30% of the work. It may happen that, at some point, these targets are not fully met, such that the first fulfillment center is actually processing 75% of the work while the second fulfillment center is actually performing 25% of the work. In this case, the two associated PID load balancers 210 compute cost values which have a bearing on the amount by which each respective fulfillment center 132 is deviating from its goals. Viewed in another way, a cost value c has a bearing on the degree of urgency which should be placed on the fulfillment center 132's deviation from its load balancing goals. Additional information regarding the meaning of the variable c will be set forth in the next section.

As will be set forth below in detail, the cost value c can be computed based on an error value e. For a particular fulfillment resource, this error value e represents the difference between the set point targets SP and the volume of orders that have been assigned to the fulfillment resource (AI). As will be described, the PID strategy applies Proportional, Integral, and Derivative (PID) processing to the error value e.

To summarize some of the terms introduced thus far:

The system-level goals are high level goals defined for the fulfillment network by a planning forecasting system or other entity.

The shipped items (SIs) reflect the orders actually fulfilled by the fulfillment resources, which, in one exemplary case, can be measured as the number of merchandise items actual shipped by the fulfillment facilities 132.

The set point targets (SPs) define the load balancing goals that govern the operation of different respective fulfillment resources.

The assigned items (AIs) reflect the orders assigned to the different fulfillment resources.

The costs (c) define variables generated by the inner loops 204 which are used by the decision system 140, as one consideration, in assigning orders (AIs) to different fulfillment resources. The meaning associated with the cost variable is discussed in further detail in the next section.

The error values (e) reflect respective differences between set point targets (SP) and assigned item values (AI).

Finally, the control structure includes a fulfillment center assignment module 212 (shortened to "assignment module" 212 below). The purpose of the assignment module 212 is to process a plurality of considerations that have a bearing on order allocation, and based thereon, to determine how the items in an order should be allocated among the different fulfillment resources (such as the different fulfillment centers 132). Exemplary such considerations include: the location of the customers; the location of the fulfillment centers; the merchandise availability at the centers; the centers' capabilities; shipping costs; item costs; material costs; processing costs; other intangible costs (including order-splitting costs and lateness costs), and so forth. Another consideration is the costs c calculated by the various PID load balancers 210. Note that the costs c define just one consideration used by the assignment module 212 to allocate orders among fulfillment resources. Thus, the costs c may suggest that a particular order is best processed by a fulfillment center A from the standpoint of load balancing considerations, but other considerations may override this determination, resulting in the selection of another fulfillment center B. This can have the effect of increasing the load balancing deviation for the particular fulfillment center (A) that has been passed over. If fulfillment center A continues to be passed over based on other considerations, its load balancing deviation (from its defined set point target) will eventually grow to the point where the assignment module 212 can "ignore" it no longer, resulting in the assignment of an order to this fulfillment center (A).

There are a number of differences between the inner and outer loops (204, 202). For the inner loops 204, automatic computer control is accomplished by the load balancers 210. For the outer loop 202, control is accomplished, according to a first exemplary implementation, by an analyst 206 changing the set point targets. There is a single outer loop 202 while there can be multiple inner loops 204. Each inner loop 204 handles a single order at a time, while the outer loop 202 considers the aggregated result of all the assignments, reflecting the operation of the fulfillment network 130 as a whole. In this manner, the inner loops 204 can execute once for every order in real time or near-real time, while the outer loop 202 executes periodically (e.g., daily). In one implementation, and as will be discussed in greater detail in the next section, the inner loops 204 do not "know" about each other. This means that they can operate independently of each other.

It can be seen that the control structure of the decision system 140 provides control of order assignments on a real time basis or on a substantially real time basis. In other words, the control structure applies closed loop control on an order-by-order basis to "steer" the fulfillment network 130 toward desired goals in view of the prevailing performance of the network 130, in a manner analogous to the way a control loop of a vehicle navigation system literally steers the vehicle, in a real time manner, along a desired path.

PID Calculations

Each PID load balancer 210 uses a PID controller. In Proportional-Integral-Derivative control, three components contribute to the control action: a term proportional to the error e, a term that is a function of the integral of error e, and a term that is a function of the derivative of the error e. For use in a continuous environment, PID control can be expressed as follows:

$$u(t) = K_P e(t) + K_I \int_0^t e(\tau) d\tau + K_D \frac{de(t)}{dt} \tag{1}$$

The first component of this equation expresses the proportional element of PID control, the second component of this equation expresses the integral element of PID control, and the third component of this equation expresses the derivative element of PID control. The K terms ($K_P$, $K_I$, $K_D$) in the equation represent constants that can be empirically selected to provide desired control for a given environment.

FIG. 3 shows a graph 300 that plots error e over time to illustrate how each of the terms contribute to the total control action. The proportional term acts on the present error e. In other words, the contribution of this term is linearly proportional to the current error e (measured as the difference between a load balancer 210's set point targets (SP) and the assigned items (AI)). The integral term acts on the past error e, as represented by the shaded portion in FIG. 3. In other words, the contribution of this term takes into account past behavior of the control structure, and particularly accounts for the fact that the error for the load balancer 210 may have been deviating from an associated set point targets for some time. The integral term ensures that the PID controller will tend to converge to the desired SP. The derivative term provides an element of prediction and acts on future error e.

However, the order-by-order decision process controlled by the decision system 140 defines a discrete process. In other words, rather than continuously, the PID load balancers 210 work in an event-driven environment, in which the PID balancers 210 are invoked at discrete points in time when customers complete orders. To accommodate this kind of environment, a discrete counterpart to equation (1) can be used. For example, the following discrete PID equation expresses PID-type control in so-called velocity form:

$$\Delta MV_n = K_s K_P \left[ \Delta E_n + K_I \cdot \Delta T \cdot E_n + \frac{K_D}{\Delta T} \cdot \Delta(\Delta E_n) \right] \tag{2}$$

$$E_n = PV_n - SP_n$$

$$K_s = \frac{MSH - MSL}{SH - SL}$$

where:

| | |
|---|---|
| MV | Manipulated variable (e.g., cost in FIG. 2) |
| $K_S$ | Scale conversion coefficient |
| $K_P$ | Proportional gain |
| $K_I$ | Integral gain |
| $K_D$ | Derivative gain |
| $PV_n$ | Process variable (e.g., AI in FIG. 2) |
| $SP_n$ | Set point variable |
| SH | PV scale high limit |
| SL | PV scale low limit |
| MSH | MV scale high limit |
| MSL | MV scale low limit |
| T | Time |

In general, a set point target (SP) defines a desired load balancing goal for a system. The process variable (PV) defines the prevailing performance of the system. The manipulated value (MV) defines a variable that is used to affect a change in the system's performance to achieve the desired goal. For example, in a cruise control mechanism, SP defines the set speed of a vehicle, PV defines the actual speed of the vehicle, and MV defines the amount of gas that is being fed to the vehicle's engine. In the context of the previous explanation of FIG. 2, the set point target variable SP corresponds to the set point targets (SP) established by the analysts 206. The process variable PV corresponds to a measure of orders assigned to a fulfillment resource.

The manipulated variable MV corresponds to the cost c generated by a particular PID load balancer 210. More intuitively stated, in an order fulfillment context, the cost values represent considerations that play a part, along with other considerations, in decided how orders are allocated among different fulfillment resources. The assignment module 212 can make these multi-consideration decisions with the end objective of reducing overall real world monetary costs to operate the fulfillment network 130. Accordingly, the cost values c which feed into the assignment module 212 also have a real world monetary connotation. In other words, the assignment module 212 can consider the costs c as "intangible costs" which must be taken into consideration with a variety of other actual costs. These costs generally all have a bearing on the real world financial efficiency of the fulfillment network 130. For these reasons, the costs c generated by the PID functionality 144 can be expressed in units of currency, such as U.S. dollars, euros, etc.

In the discrete analysis provided by equation (2), the decision system 140 computes new values of cost c when customers place orders. This means that the inner loops 204 of the decision system 140 are inactive when the customers are not placing orders. The subscript n that modifies the variables in equation (2) represents discrete instances of values for these variables. When invoked, the velocity form of the PID control strategy performs its control function in incremental fashion, that is, by computing delta cost values (e.g., ΔMV's). These values define how much the cost has deviated from a prior cost value. In a discrete event-driven context, the ΔT value can be set to unity.

Various scaling factors (K factors) can be applied to properly scale the calculations to suit the characteristics of different processing environments. For example, when first deploying the decision system 140, the online merchant 102 can operate the fulfillment network 130 in a simulated mode. In this mode, the decision system 140 can process a collection of simulated customer orders. The decision system 140 can measure how well the decision system 140 is performing in fulfilling these simulated orders (based on any combination of environment-specific metrics), and can use such performance results to adjust the values of the constants. In this manner, the online merchant 102 can iteratively adjust the constants to provide desired performance. Once the decision system 140 is formally deployed, the online merchant 102 can also use the actual performance of the fulfillment network 130 to further adjust the values of the constants. In one implementation, the derivative term can be removed by setting the derivative gain, $K_D$, to zero.

Regardless of what equation is used to compute cost c, in one implementation, each of the PID load balancers 210 can be configured to act independently of each other. This means that each load balancer 210 computes its cost value based on the difference between the SP and AI values associated with this particular load balancer 210, without considering the parallel computation of cost values that one or more other load balancers 210 might be computing. In this context, the individual load balancers 210 influence each other only to the extent that their computed cost values influence the assignment decisions made by the assignment module 210, which, in turn, changes the error values e fed into the PID load balancers 210 upon a subsequent iteration of the control algorithm.

In another implementation, the PID load balancing functionality 144 can be implemented so that the individual load balancers 210 communicate with each other during each computation of cost c. This means that load balancers 210 can consider, in advance, the consequences that their computations might have on other load balancers 210. This analysis can be used to compute cost values which are more closely tuned to the global requirements of the control structure, as defined by the set point targets (SPs). This solution might have the effect of allowing the control structure to more quickly converge to desired load balancing goals, and/or may have the effect of reducing the size of deviations from the desired goals.

In yet another variation, the analyses performed by the assignment module 212 can be combined with the analyses performed by the load balancers 210. This provision might further allow the control structure to quickly converge on desired load balancing goals. For example, note that the assignment module 212 takes into account multiple considerations, only one of which is the cost value (reflecting load balancing considerations). In the combined model, each the load balancers 210 can effectively derive its output metric based on multiple different considerations, without relying on a downstream assignment module 212 to make such multi-consideration determination.

In general, the operation of each PID load balancer 210 can be expressed in scalar notation. That is, the PID load balancer 210 receives a scalar version of error e, and from this value, computes a scalar version of cost c. The operation of all of the PID load balancers 210, in aggregate, can be expressed in vector notion. In this case, the collection of scalar error values $(e_1, e_2, \ldots e_n)$ supplied to the PID load balancers 210 defines an error vector e. The scalar cost values $(c_1, c_2, \ldots c_n)$ produced by the PID load balancers 210 define a cost vector c. A transformation matrix defines the manner in which the error vector e is transformed into the cost vector c. In the above-described case in which there is no interaction among the load balancers 210 during the computation of costs, the off-diagonal elements of the transformation matrix are zero.

According to another exemplary implementation, the decision system 140 can employ a control mechanism that constrains the calculated load balancing cost c from becoming too high or too low. For instance, this control mechanism can be used to prevent the cost c from becoming negative or excessively large or to limit the value to other desired ranges determined by the analysts 206. To accomplish this end, the control mechanism can add "anti-windup action" to the PID control algorithm. When this is done, the integral term of the PID control law becomes inactive when the calculated cost c goes beyond prescribed upper or lower threshold limits.

Control Structure Variation A: Cascaded Decision Systems

To review, FIG. 2 illustrates an implementation in which the decision system 140 is implemented by a single tier of PID load balancers 210, acting in parallel when an order is received. In other implementations, the control structure can be modified to include two or more tiers of decision systems, each of which may include their own bank of PID load balancers. The output of one decision system tier can be fed as input into a lower-level decision system tier, and so forth.

Figure 4:
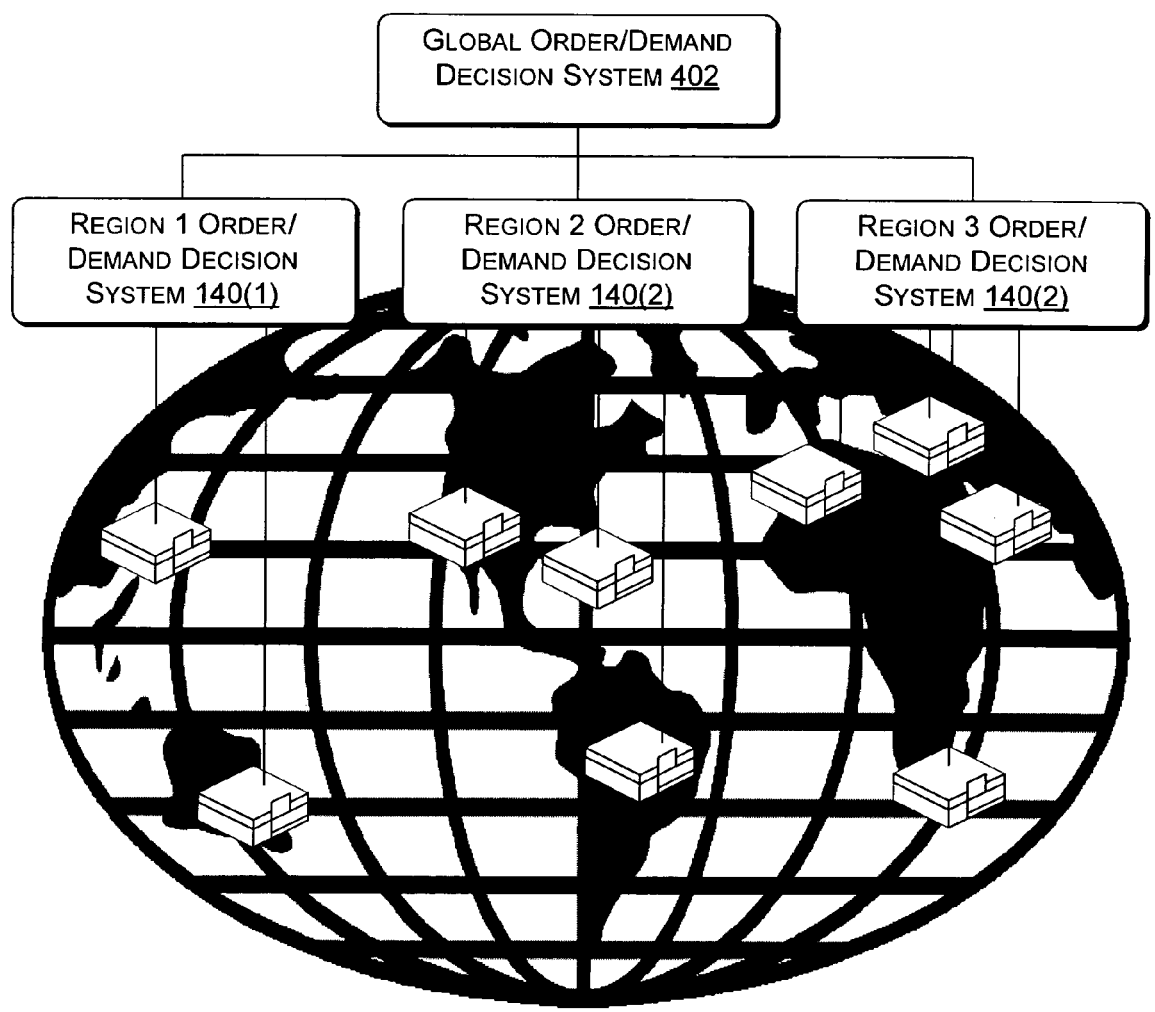
FIG. 4 illustrates another exemplary decision system in which load balancing is performed on both global and regional levels.

Consider, for example, FIG. 4. This figure shows a first tier that includes a global decision system 402. This figure also shows a collection of regional decision systems 140(1), 140(2), and 140(3). As the names suggests, the global decision system 402 makes assignment decisions on a global level, encompassing multiple regions. The individual regional decision systems 140 make decisions appropriate to individual associated regions. For example, individual regional decision systems can serve different hemispheres of the world, continents, countries, provinces, states, cities, and so forth. Although only two tiers are shown in FIG. 4, a decision system hierarchy can accommodate more than two levels of decision systems.

In one implementation, when an order is received, the global decision system 402 is invoked to determine which regional decision system 140 should be used to further process an order. The selected regional decision system 140 can then decide which fulfillment resource (e.g., which fulfillment facility) within its respective domain should be assigned to process an order. For example, when an order is received by a Japanese customer (who happens to reside in Japan), the global decision system 402 may determine that an Asian-based regional decision system 140(1) should be assigned the task of further processing the order. The Asian-based regional decision system 140(1) then goes to work, deciding which fulfillment center should be given the task of processing the order.

Each decision system in the architecture of FIG. 4 can incorporate PID load processing functionality 144 or some other closed loop control functionality. In the manner described above, the load processing functionality 144 computes a series of costs c which are used by an assignment module—along with other considerations—to determine how to process a particular order. The decision of the assignment module in a particular tier invokes a regional decision system in a lower level tier, upon which the above-described processing is repeated for that level. In an alternative implementation, the cascaded analysis performed in the multiple tiers can be combined in part or in whole, such that global and regional decision-making is performed at the same time. Still other variations of this design strategy are possible.

Control Structure Variation B: Automated or Semi-Automated Outer Loop

To review, FIG. 2 illustrates an implementation in which the outer loop 202 relies on human analysts 206 to define the set point targets (SPs). In other implementations, the outer loop 202 can use a control system to fully or at least partially automate the computation of SPs.

Figure 5:
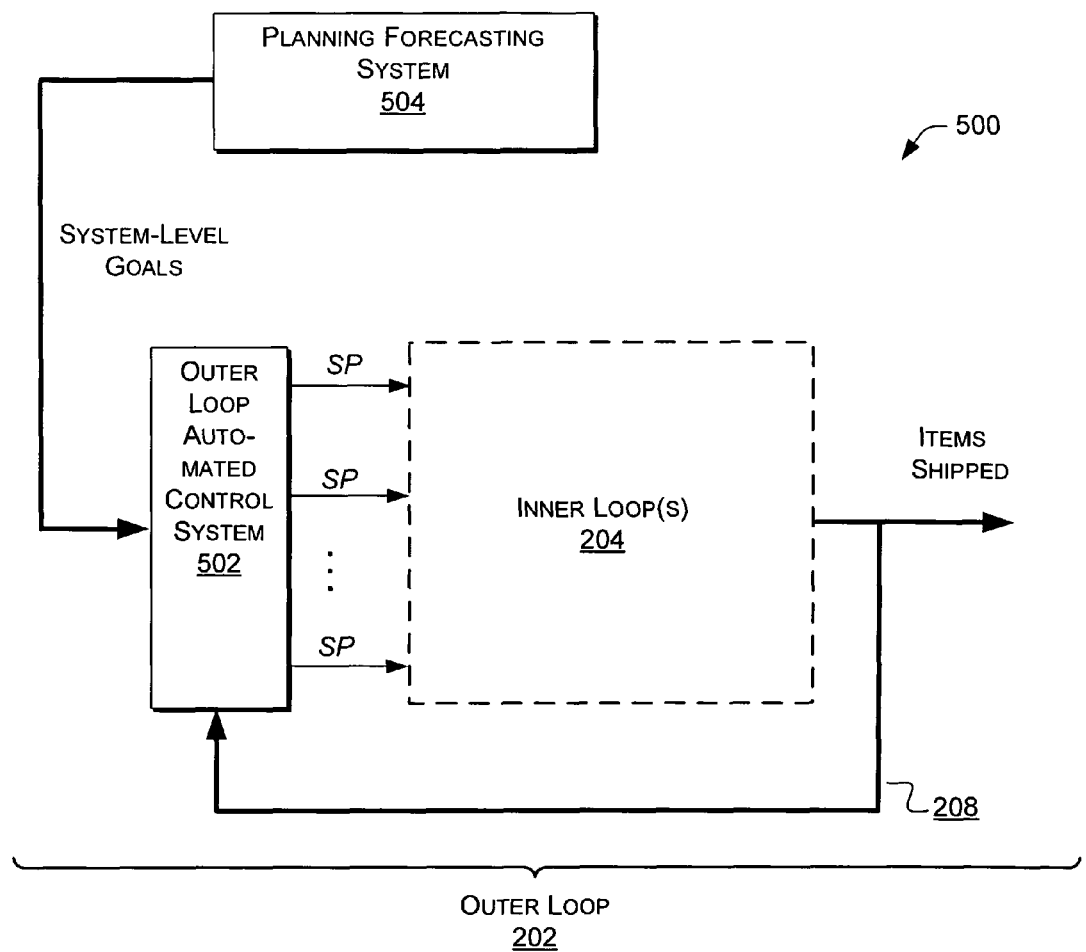
FIG. 5 shows another exemplary decision system in which a manually controlled outer loop (shown in FIG. 2) is replaced by an automated (or substantially automated) outer loop.

Consider, for example, FIG. 5. This figure shows a system 500 which comprises an outer loop 202 (as defined in FIG. 2), that includes, as a component thereof, the series of inner loops 204. Instead of the human analysts 206, or in addition to the human analysts 206, the outer loop 202 can use an automated control system 502.

The automated control system 502 can receive the above-described system-level goals from a planning forecasting system 504. These system-level goals represent the overarching goals objectives for the fulfillment network 130 (which will vary depending on different environments and associated business considerations). The automated control system 502 also receives input from the feedback path 208. This feedback path 208 provides information regarding the overall actual performance of the fulfillment resources, such as the number of items shipped (SIs) by each fulfillment center 132, the aggregate number of assignments (AIs) fed into the fulfillment centers 132, the aggregated number of assignments (AIs) fed into the fulfillment centers 132 as offset by order cancellations and reassignments, etc., or some other performance metric. In response to these inputs, the automated control system 502 generates the set point targets (SPs), which feed into the inner loops 204. These set point targets, in turn, govern the operation of the inner loops 204 in the manner described above. In this manner, the outer loop 202 defines an automated control loop which envelops a series of inner automated loops 204.

More specifically, the automated control system 502 can be fully automated. In this case, no analyst needs to intervene in the operation of the control system 502. In another implementation, the automated control system 502 can be only partially automated. In this case, for example, the automated control system 502 can also receive manual instructions from analysts. The instructions can be used to adjust certain operating parameters so as to, for example, correct the behavior of the system 500 in an ad hoc manner when it begins to "veer off course" from desired performance, based on the personal judgments of the analysts. In contrast, the inner loops 204 operate in a fully automatic manner or a substantially fully automatic manner in the manner described above with respect to FIG. 2.

The automated control loop defined by the system 500 can be implemented using various closed loop control strategies. For instance, the automated control system 502 can itself incorporate a PID controller or controllers. In this manner, the system 500 comprises an outer PID control loop which envelops and controls a plurality of inner PID control loops. Still other variations of this cascaded control motif are possible.

Exemplary Computing Device

Figure 6:
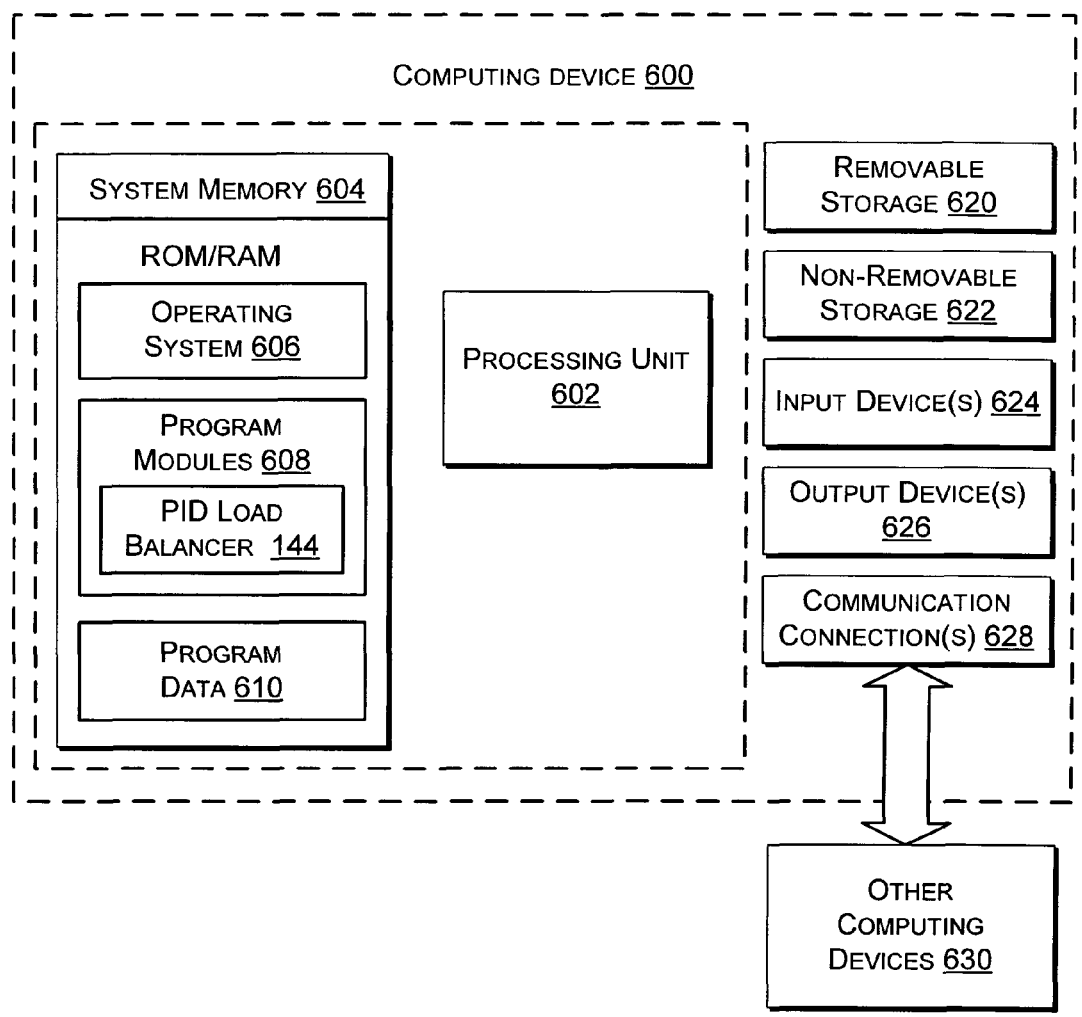
FIG. 6 is a block diagram showing functional modules in a computing device that can be used to implement different aspects of the architecture of FIG. 2.

FIG. 6 illustrates a computing device 600 that can be used to implement aspects of the decision system 140 introduced in the context of FIG. 2. For example, this computing device 600 can represent one or more of the servers 142 used by the decision system 140. (And insofar as the computing device 600 includes conventional computing hardware, FIG. 6 also represents functionality that can be used to implement any other computer-related aspect of the architecture 100 shown in FIG. 1, such as the web server equipment 110, individual computer devices 106, and so forth). The computing resources shown in FIG. 6 can be implemented at a single site or distributed over plural sites.

The computing device 600 can include at least one processing unit 602 and system memory 604. Depending on the configuration and type of computing device 600, the system memory 604 can be implemented as volatile memory (such as RAM), non-volatile memory (such as ROM, flash memory, etc.), or some combination of the two. The system memory 604 can include an operating system 606, one or more program modules 608, program data 610, and so forth. In the context of the present subject matter, the program modules 608 can include the PID load balancing functionality 144 and potentially other aspects of the control structure of FIG. 2 (such as the assignment module 212). In general, the programs modules 608 can be implemented as computer readable instructions, various data structures, and so forth. The computer instructions can be expressed using any programming technology; the instructions can also include markup language content (e.g., XML).

The computing device 600 can include additional features or functionality. For example, the computing device 600 can also include additional data storage devices, such as removable storage 620 and/or non-removable storage 622 (e.g., magnetic disks, magnetic tape, optical disks, static RAM devices, and so forth), along with associated media reading/writing functionality.

The computing device 600 can also include various input device(s) 624, such as a keyboard, a mouse, a voice input device, a touch input device, and so on. The computing device 600 can also include various output device(s) 626, such as a display, speakers, printer, and so on. Finally, the computing device 600 can also include a communication interface 628 that allows the device 600 to communicate with other computing devices 630 over the network 104 of FIG. 1. The communication interface 628 can be implemented in any fashion, such as broadband (e.g., T1) interface, a telephone modem interface, a cable modem interface, a DSL-type interface, and so forth.

One or more bus structures (not shown) internally couple each of the above-described modules together.

Operation

Figure 7:
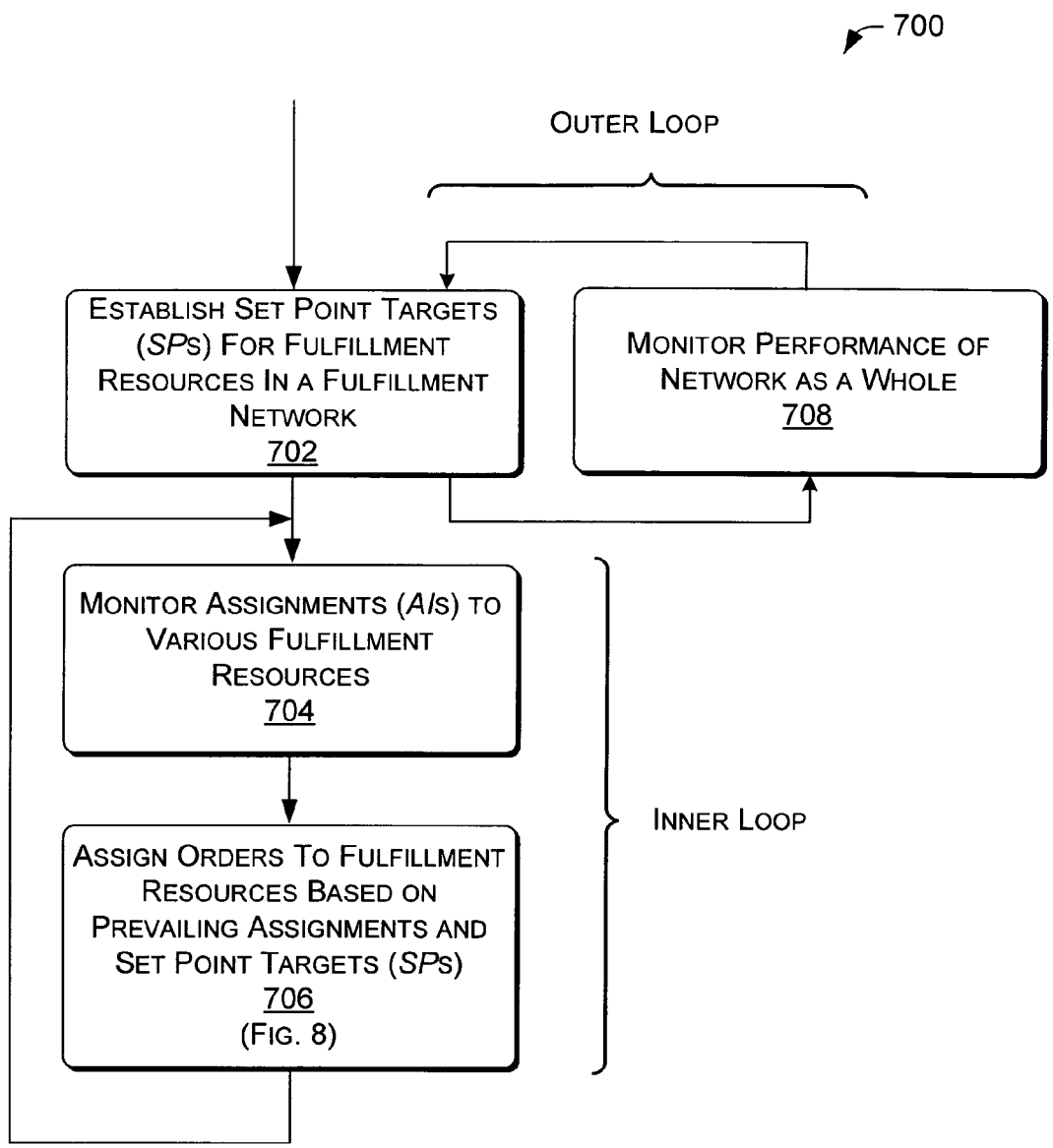
FIG. 7 is a flow diagram of a process for balancing requests across multiple fulfillment resources in a fulfillment network.

FIG. 7 shows a process 700 for balancing requests across multiple fulfillment resources in a fulfillment network. The process is illustrated as a collection of blocks in a logical flow graph, which represent a sequence of operations that can be implemented by manual processing, hardware, software, or some combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The sequence in which the operations are described is not intended to be construed as a limitation, and any number of the described blocks can be combined in any sequence and/or in parallel to implement the process. To facilitate explanation, the process 700 is described with reference to the architecture 100 of FIG. 1 and the control structure of FIG. 2.

In step 702, the analysts 206 establish set point load balancing targets (SPs) for particular fulfillment resources. In the example set forth in FIG. 1, the fulfillment resources correspond to different fulfillment centers 132. The set point targets can be expressed in various ways, such as percentages. For example, a particular set point target might define the percentage of total order volume that a particular fulfillment center is required to process. The analysts 206 make their set point target selections based on performance considerations that are pertinent to the operation of the fulfillment network 130 as a whole, as reflected by the outer loop 202 shown in FIG. 2. As shown in FIG. 5, the analysis performed by the analysts 206 can be replaced or supplemented using the automated control system 502 of FIG. 5.

In step 704, the decision system 400 monitors the orders assigned to the fulfillment resources, as reflected by the AI values. These assignments do not necessarily reflect the actual items shipped out to customers (SIs), because the fulfillment resources might not be able to fulfill all of the assigned orders (e.g., due to reassignments, cancellations, etc.)

In step 706, the decision system 140 assigns orders to various fulfillment resources (such as fulfillment centers 132) based on the performance data (e.g., AI values) collected in step 704, along with other considerations. Step 706 generally represents the kind of processing described in the context of FIG. 2.

In general, the procedure 700 shown in FIG. 7 illustrates a feedback loop in which assignments (AI) are continually being monitored in step 704, and new assignments are continually being made in step 706 in response to the monitored assignments and the defined set point targets (SPs). Moreover, in the operation of the outer loop 202, the analysts 206 (or the automated control system 502) may change the set point targets (SPs) at any time based on any number of considerations, e.g., based on an assessment of the performance of the fulfillment network 130 as a whole, as determined in step 708. This aspect of FIG. 7 defines an outer feedback loop. The results of the outer feedback loop govern the inner feedback loop.

By virtue of the use of a PID control algorithm, the AI values will generally track the set point targets (SPs). However, this tracking operation is "spongy," meaning that the fulfillment network 130 is allowed to deviate somewhat from an overly rigid application of load-balancing demands. By virtue of the integral term in the PID processing, the decision system 140 will eventually rectify any deviations, correcting for past accumulated error.

Figure 8:
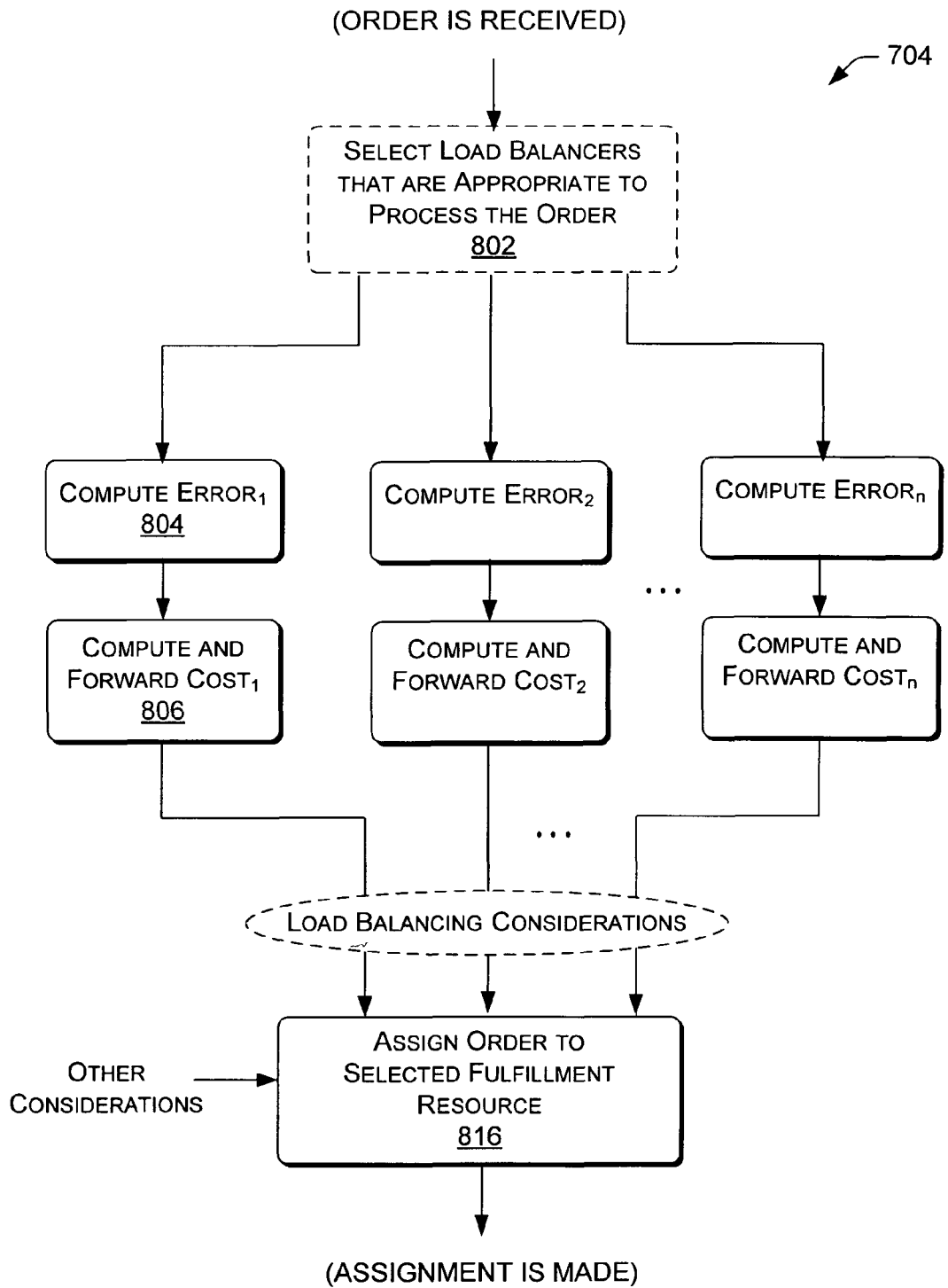
FIG. 8 is a flow diagram showing the load balancing operation of FIG. 7 in greater detail.

FIG. 8 provides more detail regarding one exemplary implementation of step 706 of FIG. 7. The operations shown in FIG. 8 take place in the context of the processing of a single order.

In step 802, the control structure (of FIG. 2) selects an appropriate subset of load balancers 210 to handle a specific order. For example, as explained in the context of FIG. 2, the load balancing network 130 may allocate different processing queues for handling different categories of requests, including time-related processing queues, product-related processing queues, and so forth. This means that, for a given request, the control structure might not need to invoke all of the load balancer 210—but can rather invoke only those load balancers 210 which are pertinent to the type of request that has been received. Step 802 performs this selection operation.

The middle tier of steps in FIG. 8 represents parallel operations performed by each load balancer 210. Each load balancer is associated with a different respective fulfillment resource. In a simplified case, the different fulfillment resources can correspond to different fulfillment centers for processing requests. In a more advanced case, any given fulfillment center can employ multiple processing queues for processing requests, such as time-related queues, product-related queues, and so forth. The operations performed by the load balancers 210 are described in the context of operations performed by a first representative load balancer (e.g., load balancer 210(1) shown in FIG. 2), keeping in mind that this explanation also applies to the other load balancers shown in FIG. 8.

In step 804, the load balancer 210(1) computes an error value e. This error value reflects a difference between a set point (SP) assigned to the associated fulfillment resource and the order assignments that are sent to the assignment resource.

In step 806, the load balancer 210(1) computes a cost value c based on the error value e. This cost c can be computed using a PID algorithm, such as by using equation (2) defined above, which computes a delta cost value using a velocity-based PID approach. The PID algorithm includes a proportion term which applies proportional analysis to the current manifestation of the error value e, an integral term which applies integral analysis to a time span of prior error values e, and an optional derivative term.

In step 808, the assignment module 212 receives all of the cost values from the individual load balancers 210 and uses these cost values to allocate requests to different fulfillment resources. The assignment module 212 bases its assignment decisions on other considerations in addition to load balancing considerations. As such, the cost values c may not alone be determinative, in every iteration of the control algorithm, of the assignments made by the control structure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method for processing requests in a fulfillment network having plural fulfillment resources with which to fulfill the requests, the computer-implemented method comprising:
   under control of one or more computer systems configured with executable instructions,
   defining, via an outer loop, at least one set point target defining at least one load balancing target; and
   allocating requests, via a series of inner loops, to respective fulfillment resources in the fulfillment network, the series of inner loops to:
      receive the at least one set point target that defines the at least one load balancing target for at least one of the fulfillment resources;
      monitor existing assignments in the fulfillment network to determine a cost value for each of the fulfillment resources, the cost value based at least in part on an error value that represents a difference between the set point target and a volume of orders that have been assigned to a respective fulfillment resource; and
      assign each of the requests to one or more of the fulfillment resources based at least in part on the assignment information and said at least one set point target,
      wherein the inner loops that determine the error value, determine the cost value, and assign the orders operate independent from one another, and wherein the requests correspond to respective instructions by entities to perform one or more actions with respect to one or more items of merchandise,
   wherein the series of inner loops process individual merchandise orders while the outer loop processes aggregated merchandise orders representing an operation of the fulfillment network as a whole.

2. The method of claim 1, wherein the entities are users and the one or more actions pertain to acquiring the items.

3. The method of claim 1, wherein the fulfillment resources correspond to different respective fulfillment centers for processing the requests.

4. The method of claim 1, wherein the fulfillment resources correspond to different respective time-related queues for processing the requests.

5. The method of claim 1, wherein the fulfillment resources correspond to different respective item-related queues associated with the requests.

6. The method of claim 1, wherein said at least one set point target is manually defined based on an assessment of the performance of the fulfillment network.

7. The method of claim 1, wherein said at least one set point target is substantially automatically defined based on an assessment of the performance of the fulfillment network.

8. The method of claim 1, wherein the closed loop control algorithm comprises a Proportional, Integral, Derivative (PID) algorithm that assigns a unique PID load balancer to each of the fulfillment resources.

9. The method of claim 8, wherein a derivative gain coefficient of the PID algorithm is zero.

10. The method of claim 1, wherein the controlling comprises controlling assignment of the requests to respective ones of the fulfillment resources based on at least one other consideration in addition to load balancing considerations.

11. The method of claim 1, wherein the controlling comprises applying plural tiers of control operation, where the output results of at least one tier feed into a lower-level tier as input.

12. The method of claim 1, wherein the controlling is executed substantially in real time in response to the receipt of requests.

13. The method of claim 1, wherein the controlling is executed on an event-driven basis in response to the receipt of requests, wherein the requests define respective events.

14. The method of claim 1, wherein the controlling is executed in a substantially fully automated manner.

15. The method of claim 1, wherein the controlling is executed, at least in part, in a manual manner.

16. A computer-implemented method for processing requests in a fulfillment network, wherein the requests correspond to respective instructions by entities to perform one or more actions on one or more items of merchandise, the computer-implemented method comprising:
   under control of one or more servers configured with executable instructions:
   allocating requests, via a series of inner loops, to respective fulfillment resources in the fulfillment network using a load balancing target for each merchandise order, the series of inner loops to:
      compute an error value for each of the respective fulfillment resources as a difference between a load balancing target and order assignments to the respective fulfillment resources,
      compute a cost value based at least in part, on the error value, and
      assign an order request to one of the respective fulfillment resources based at least in part on the cost value,
      wherein the inner loops that compute the error value, compute the cost value, and assign the order operate independent from one another; and
   defining, via an outer loop, at least one set point target defining the load balancing target used by the series of inner loops to govern the allocation of requests to respective fulfillment resources,
   wherein the series of inner loops process individual merchandise orders while the outer loop processes aggregated merchandise orders reflecting an operation of the fulfillment network as a whole.

17. The method as recited in claim 16, wherein the outer loop balances workload allocations based, at least in part, on a Proportional, Integral, Derivative (PID) algorithm.

18. The method as recited in claim 16, wherein the fulfillment resources correspond to different respective fulfillment centers for processing the requests.

19. One or more computer media storing computer-executable instructions that, when executed by one or more processors, cause the one or more processors to perform acts comprising:
    allocating requests, via a series of inner loops, to respective fulfillment resources in the fulfillment network using a load balancing target for each merchandise order, the series of inner loops to:
        compute an error value for each of the respective fulfillment resources as a difference between a load balancing target and order assignments to the respective fulfillment resources,
        compute a cost value based at least in part, on the error value, and
        assign an order request to one of the respective fulfillment resources based at least in part on the cost value,
        wherein the inner loops that compute the error value, compute the cost value, and assign the order operate independent from one another; and
    defining, via an outer loop, at least one set point target defining the load balancing target used by the series of inner loops to govern the allocation of requests to respective fulfillment resources,
    wherein the series of inner loops process individual merchandise orders while the outer loop processes aggregated merchandise orders reflecting an operation of the fulfillment network as a whole.

\* \* \* \* \*